Feb. 1, 1949.  J. A. SOISSA  2,460,605
APPARATUS FOR FEEDING FLOWABLE MATERIAL
FROM A PLURALITY OF CONTAINERS
Original Filed May 7, 1941  6 Sheets-Sheet 1

Inventor:
John A. Soissa
By Alfred F. Ernst
Attorney

Inventor:
John A. Soissa
By Alfred F. Ernst
Attorney.

Feb. 1, 1949.  J. A. SOISSA  2,460,605
APPARATUS FOR FEEDING FLOWABLE MATERIAL
FROM A PLURALITY OF CONTAINERS
Original Filed May 7, 1941  6 Sheets-Sheet 5

Inventor:
John A. Soissa
By: Alfred F. Ernst
Attorney:

Patented Feb. 1, 1949

2,460,605

UNITED STATES PATENT OFFICE 2,460,605

APPARATUS FOR FEEDING FLOWABLE MATERIAL FROM A PLURALITY OF CONTAINERS

John A. Soissa, Winnetka, Ill., assignor to Certain-teed Products Corporation, Chicago, Ill., a corporation of Maryland Original application May 7, 1941, Serial No. 392,261. Divided and this application August 7, 1944, Serial No. 548,436

13 Claims. (Cl. 222—14)

This invention relates to an apparatus for feeding flowable material. The invention especially relates to the feeding of comminuted material for surfacing a web or sheet and is particularly concerned with the preparation of and the feeding of surfacing materials which will have different and predetermined colors.

An object of the invention is to provide an apparatus for producing a roofing web having on a face thereof a variety of color areas of predetermined color or predetermined length or of both predetermined color and length.

A further object of the invention is to provide an apparatus for producing a roofing web having on a face thereof color areas having considerable variety of colors, which colors are produced by the blending of a relatively small number of surfacing materials of primary or initial colors. The application of these colors to the face of the web may be carried out in such a manner as to produce color areas of different but predetermined lengths on said face of the web.

In one phase of the invention a supply of flowable material or of granular surfacing material of indeterminate amount is provided and discharge therefrom of a metered quantity toward a face of a moving web is effected. Metering preferably is carried out independently of conditions associated with the web movement. The metered mass of surfacing material may be intercepted and collected in a suitable accumulating space in its path of travel toward the face of the web and feed of the intercepted material from the accumulating space to the face of the web may be caused at a rate predetermined in accordance with the rate of web movement so that the mass will become distributed over a predetermined length of the face of the moving web.

The invention in another phase provides a plurality of supplies containing different primary or given color surfacing materials. Discharge of metered volumes or masses from at least a selected two of the supplies is effected to maintain a predetermined ratio between the metered volumes fed from the respective supplies. The total volume or mass fed from the supplies is thus also predetermined. Intermixture of the primary color masses is effected by suitable mixing means to produce a composite blend of the surfacing materials. The blended mass may then be fed to a suitable storage space or it may be fed directly to the face of the roofing web at a rate determined in accordance with the web movement to cover a predetermined length of the face of the web.

The invention provides suitable apparatus for metering and controlling discharge of the different primary color surfacing materials whereby from a selected number of primary supplies a given total quantity of surfacing material may be discharged. Different predetermined ratios of the volumes of given primary colored materials discharged may be selected to produce the same total quantity of the batch. On the other hand the control of discharge may be so effected that different total quantities of surfacing material are discharged from the supplies while a predetermined ratio is maintained between the volumes discharged from respective primary supplies and are mixed to produce different quantities of the same blend.

Various types of apparatus and processes have been proposed in the prior art for producing a surfaced roofing web having a number of different color areas on the face thereof of the same or different lengths and in either contiguous or discontiguous relation. From a "multi-color" web of this type covering elements, such as shingles, may be cut which may be assembled on a structure to produce a variegated appearance and to avoid a dull and monotonous appearing covering such as may result when covering elements surfaced with surfacing materials of a single color are used.

Typical prior art proposals for production of the so-called "multi-color" roofing are described in Patents No. 1,791,560 to Heppes, issued February 10, 1931; Nos. 2,074,130 and 2,074,131 to Fenley et al., issued March 16, 1937; and No. 2,157,944 to Walton, issued May 9, 1939.

The number of different color areas which may be produced on a roofing web utilizing such prior art processes is restricted to the number of supplies actually provided by the apparatus. Because of space limitations, it is usual to provide only a limited number of supplies of different colors or of blends of colors of the surfacing materials from which surfacing materials of different character may be withdrawn and laid over given areas of the face of a roofing web. In the prior art proposals, also, difficulties may be encountered when it is desired to change from production of a roofing web carrying one series of color areas or blends to production of a web surfaced with other color surfacing materials. There is usually left in each of the supplies a quantity of surfacing granules which must be bagged, stored and classified separately for later use if the material is not to be wasted or used for mixed slate.

The invention purposes to eliminate the disadvantages of the prior proposals by providing surfacing apparatus having supplies of only the primary or single colored surfacing materials. By certain control means discharge of metered masses of selected colors from one or more of the supplies is effected to deliver the constituent colors of a given blend in proper quantities or in proper ratios of volume or amounts of the different colors. Mixing means are provided to intermix the constituent colors and produce a uniform blend which may then be applied by suitable apparatus to the face of the roofing web as a color area. The separate volumes or masses discharged from the different primary supplies to become the constituent colors may be so measured that the total mass discharged from the supplies is predetermined in order to surface a given length of the web when applied or spread upon the face of the web at a rate determined in accordance with the web movement.

Because there is no unlimited accumulation or storage of the different blends of surfacing materials in the apparatus of the invention, due to the determination of the total quantity of each blend to cover only a given length of web, there is no need to bag, store or classify accumulated blends as required by the prior art proposals when a change of color of surfaced web is to be made. At each discharge the blend may be changed and the quantity metered without excess.

By the provision of control and proportioning means for effecting discharge of the metered masses from selected supplies, the invention may be used to accomplish a quick change from producing a web having one group of color areas to a web having areas of different color surfacing without necessarily providing new supplies from which the new, different color surfacing material may be fed. This feature is secured by the provision of only primary color supplies from which by selection of correct quantities or volumes of the primary colored material any given color blend may be produced at will and any desired sequence of blended colors may be applied to the web.

The apparatus of the invention may be utilized in connection with existing surfacing machines, such as for example, the prior art proposals noted above, to supply the hoppers thereof, or other chambers for containing surfacing materials, which the blends produced from the primary colored supplies of the present invention. In this way a greater variety of colors or blends of surfacing materials are available for delivery to the existing machines which may be operated in their usual manner to apply the surfacing to the face of the web.

Other objects and advantageous features of my invention will be described in connection with the drawings in which:

Fig. 6 is a section taken on line 6—6 of Fig. 5a.

Figures 1, 2, 3:
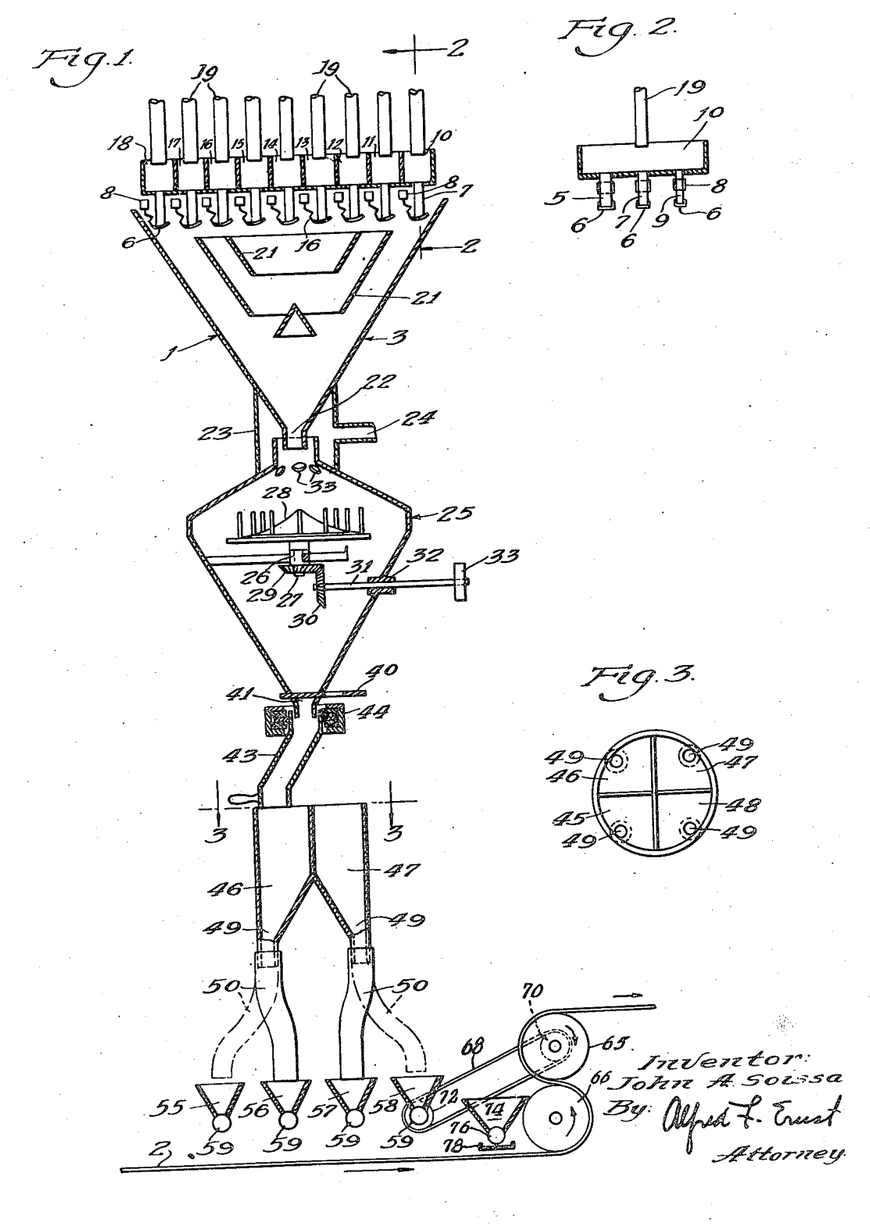
Fig. 1 is a diagrammatic vertical sectional view of the apparatus of the invention.
Fig. 2 is a section on the line 2—2 of Fig. 1.
Fig. 3 is a section on the line 3—3 of Fig. 1.

In Figs. 1, 2 and 3 is shown the blending and surfacing apparatus of the invention. The apparatus 1 in Fig. 1 is positioned above a roofing web 2 drawn in the direction of its length by drums 65 and 66 of a roofing machine.

A plurality of bins 10, 11, 12, 13, 14, 15, 16, 17 and 18 each may have outlet openings 5, 7 and 9 thereof arranged to discharge into a receiving hopper 3. The bins 10 to 18 are maintained filled with different primary color surfacing materials by hoses 19 connected to reservoir supplies of the primary color materials not shown.

The cross sectional areas of the outlet openings 5, 7 and 9 of the bins 10 to 18 preferably are in the ratio 4-2-1, so that the ratio of volume of comminuted materials discharged from the openings 5, 7 and 9 will be 4-2-1 respectively for a predetermined time of flow. Each of the openings 5, 7, and 9 of each of the bins 10 to 18 is provided with a gate 6 for controlling and proportioning the flow of the surfacing material individually from the different outlets of the bins 10 to 18. A plurality of solenoids 8 are respectively connected to the proportioning gates 6 to cause flow therethrough of the surfacing materials upon energizing thereof and to stop flow through the gates upon deenergizing thereof.

Baffles 21 within the receiving hopper 3 are provided to equalize the time for flow of the materials discharged into the hopper 3 to the outlet 22 thereof.

A mixing chamber 25 is connected to the outlet neck 22 of the hopper 3 and jacket 23 is provided to enclose the connection. The outlet 24 of the jacket 23 may be connected to any suitable suction device in order to withdraw dust from the mixing chamber through openings 33.

Mounted within the mixing chamber 25 in bearing 26 is a vertical shaft 27 having a mixing rotor 28 secured to the upper portion thereof and bevel gear 29 secured to the lower portion thereof. Another bevel gear 30 mounted on shaft 31 in bearing 32 is in mesh with the gear 29 to effect drive of the rotor 28 when the pulley 33 on shaft 31 is driven by suitable power means not shown.

While in the particular embodiment of the mixer illustrated I have shown a rotor 28 having upstanding pins on the upper surface thereof to effect the mixing, it is to be understood that any mixer suitable to effect continuous blending and delivery of the mixed comminuted surfacing materials may be utilized.

A gate 40 is provided adjacent the restricted lower outlet opening 41 of the mixing chamber 25 which is operable to cause or prevent flow of comminuted materials therefrom. This outlet opening 41 of the mixing chamber 25 is arranged to discharge comminuted materials into a revoluble spout 43 mounted in bearing 44. The spout 43 may be directed to effect discharge of comminuted materials from the mixing chamber 25 to one of the accumulating hoppers 45, 46, 47, and 48, Figs. 1 and 3. The outlet openings 49 of the accumulating hoppers are connected by hoses 50 respectively to delivery hoppers 55, 56, 57, and 58 provided with feed rolls 59 extending transversely across the web 2. The feed rolls 59 may be driven from drums 65 and 66, e. g., by a chain 68 upon sprockets 70 and 72 to effect feed of the comminuted materials from the delivery hoppers to the face of the web 2 at a rate predetermined in accordance with the web movement. The drums for these hoppers may be so connected to each other as to effect laying of the comminuted materials of the respective delivery hoppers upon predetermined areas of the web 2 as disclosed in the prior art. The excess comminuted material spilled from drums 66 may be returned to hopper 76 for feeding to conveyor 78 to be carried away thereby.

In order to deposit a given length of colored surfacing material on the face of the web 2 the elementary mode of operation may be as follows. One or more of the solenoids 8 connected to the proportioning gates 6 of a given supply such as bin 10, for example, is energized by an electric current for a time period predetermined to cause discharge of a metered quantity or volume of surfacing material from the bin 10 to the receiving hopper 3. The surfacing material from bin 10 travels by gravity through the hopper 3 and mixing chamber 25 and is collected as a mass above the gate 40. When the metered batch or mass of surfacing material has accumulated above the gate 40, the gate is operated by hand or by suitable control means to discharge the mass of surfacing material through the revoluble spout 43 to an accumulating hopper, as for example 46, and is thereafter closed. The accumulating hopper 46 discharges into the delivery hopper 56. The feed roll 59 of the hopper 56 may be continuously driven to feed the surfacing material from the accumulating hopper 46 to the face of the web 2 at a rate predetermined in accordance with the rate of movement of web 2 in order to distribute the metered mass of surfacing material over a predetermined length of the face of the web 2.

A different surfacing material may be applied in contiguous relation to the first applied surfacing, if desired, by discharging a metered volume or mass from a different color supply of surfacing material such as bin 14, by energizing one or more of the solenoids 8 connected to operate proportioning gates 6 of outlet openings 5, 7 and 9 thereof. This second metered mass discharged from bin 14 is collected above the gate 40 and the spout 43 is revolved to direct materials for discharge into the accumulating hopper 47 while the mass of surfacing material first discharged from the bin 10 is being distributed over a predetermined length of the face of the web being fed from the distributing hopper 56. The gate 40 may then be operated in relation to the exhausting of surfacing material from the hopper 56 so that the second metered mass is directed to the accumulating hopper 47 and is fed therefrom through distributing hopper 57 to reach the face of the web 2 just as the end of the color area of surfacing material applied by hopper 56 comes under the feed roll 59 of the hopper 57.

When it is desired to apply as a color area on the face of the web a blend of two or more of the primary colored surfacing materials from the bins 10 to 18, predetermined ratios of volumes of surfacing materials are fed from the selected supplies by energizing the solenoids 8 to operate the proper proportioning gates of the respective supplies to discharge predetermined individual quantities of each color into the receiving hopper 3. Baffles 21 guide the different colored surfacing materials to the outlet 22 of the receiving hopper and into the mixing chamber 25. The mixer rotor 28 is driven to effect thorough intermixture of different primary colored surfacing materials. The blend is collected as a mass above the gate 40 to be discharged into one of the accumulating hoppers 45, 46, 47 and 48 and then distributed over a predetermined length of the face of the web as described above in connection with the surfacing by single primary color materials.

It is to be understood that by providing a suitable apparatus for control of the operation of the proportioning gate 6 that a predetermined metered mass of a single primary color or of blended surfacing materials may be delivered and distributed over a predetermined length of the face of the web 2 in contiguous or, if desired, in discontiguous relation to the adjacent color area previously fed.

As a modification the gate 40 may be eliminated by providing suitable apparatus for controlling the operation of the proportioning gates 6 in stepped relation to the movement of the spout 43. This may be effected so that as a previously metered mass is being distributed over the face of the web from an accumulating hopper the spout 43 may be turned to the position of discharge into an adjacent or another accumulating hopper and discharge of the surfacing materials from selected bins 10 to 18 thereafter may be effected to cause the second metered mass to flow to its accumulating hopper for distribution over the face of the web substantially when the last portion of the previously applied color area material passes beneath the feed roll thereof.

Figs. 4a, 4b, 5a and 5b illustrate a practical embodiment of the apparatus of the invention. The apparatus 100 comprises a frame 101 having mounted on the upper member thereof a plurality of bins 110, 111, 112, 113, 114, 115, 116, 117, 118, for containing supplies of different primary color surfacing materials. The bins 110 to 118 may be maintained filled with the different primary color surfacing materials through the inlet openings 120 thereof by means of hoses from indeterminate supplies of the surfacing materials not shown.

Figure 5A:
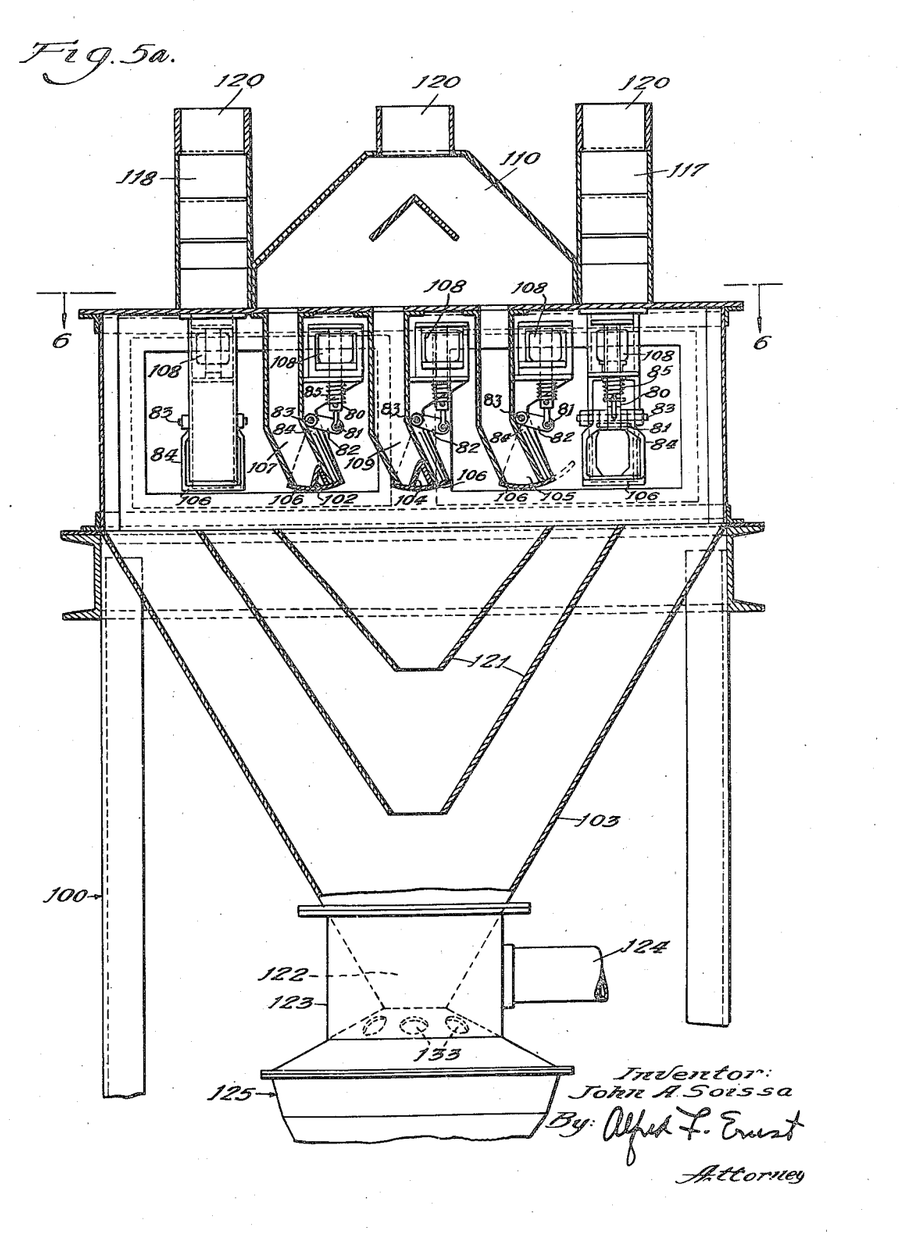
Figs. 5a and 5b together show a section taken substantially on lines 5—5 of Figs. 4a and 4b.
Figure 6:
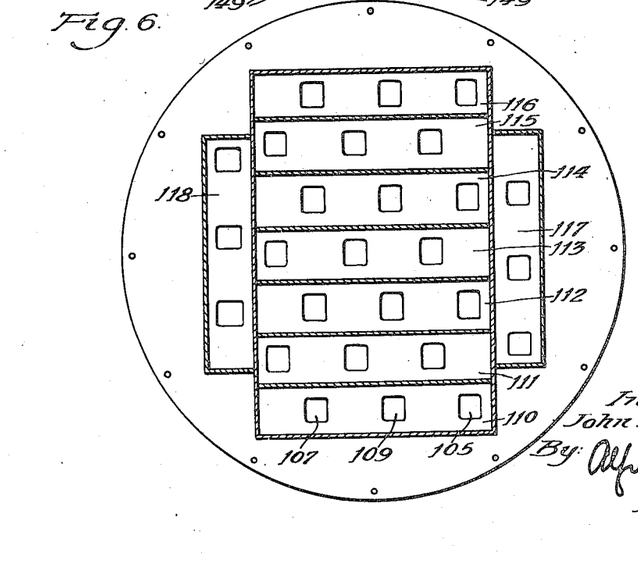

The bins 110 to 118 are positioned as indicated in Fig. 6 and have outlet openings 105, 107, and 109 thereof arranged to discharge into a receiving hopper 103. As can be seen in Fig. 5a the outlet openings 107 and 109 are restricted by inserts 102 and 104 to provide less area for flow of the surfacing materials than the outlet opening 105. The ratio of the cross sectional areas of the outlets 105, 107, and 109 may be, for example, 4-2-1, so that for a predetermined time of flow through the respective outlet openings 105, 107, 109 the ratio of the volumes of the materials discharged will be 4-2-1. This relation may be taken as preferred to secure any ratio in the relatively wide range of from 1-1 to 7-1. Within the scope of the invention, however, other ratios of the outlet areas and a different number of openings per bin may be used to obtain larger or smaller quantities of material from each bin and to secure variation of the ratios so as to effect variation of the blends.

Flow governing gates 106, respectively associated with the proportioning openings 105, 107, and 109 of the bins 110 to 118, are provided to govern flow of surfacing materials to be discharged from the different outlets of the bins 110 to 118. Solenoids 108 are respectively connected to the flow governing gates 106 to cause flow through the openings upon energizing of the solenoids and to stop flow upon deenergizing thereof. As shown in Fig. 5a, the moving core 80 of the solenoid 108 is pivotally connected at 81 to crank arm 82. The arm 82 may be keyed to shaft 83 upon which the upper portion 84 of the gate 106 is mounted to be turned thereby. A spring 85 is provided to bias the crank arm 82 to maintain the gate 106 in the closed position.

The receiving hopper 103 is provided with baffles 121 to equalize the time for flow of the surfacing materials discharged thereinto toward the outlet 122 thereof. A mixing chamber 125 is connected to the outlet 122 of the receiving hopper 103 by a jacket 123 provided with an exhaust connection 124 for effecting removal through openings 133 of any dust developed during the mixing operation.

The mixer in the mixing chamber 125 may be of the type illustrated in Fig. 1 or it may be of any suitable construction which is effective continuously to intermix and deliver comminuted surfacing materials fed thereto.

The outlet opening 141 of the mixing chamber 125 is arranged to discharge the mixed surfacing materials into a revoluble spout 143. The spout 143 is constructed and arranged to direct discharge of surfacing materials from the mixing chamber 125 to one of a plurality of accumulating hoppers, 150, 151, 152, 153, 154, 155, 156, 157, 158, 159, 160, 161. The outlet openings 149 of the accumulating hoppers 150 to 161 are arranged about the axis of rotation of the spout 143 as may be seen in Fig. 7 and may be connected by hoses to deliver mixed surfacing materials accumulated therein to different supplies of surfacing materials maintained in suitable apparatus not shown, for applying the surfacing material to a roofing web, for example, as in Figure 1.

A pressure switch 162 is mounted on each of the accumulating hoppers 150 to 161 and is operable to close an electrical circuit through the contact points 164 thereof when the material within the accumulating hopper has reached a predetermined height, and to open the circuit through the points when the level falls below a predetermined level.

Figures 5B, 7:
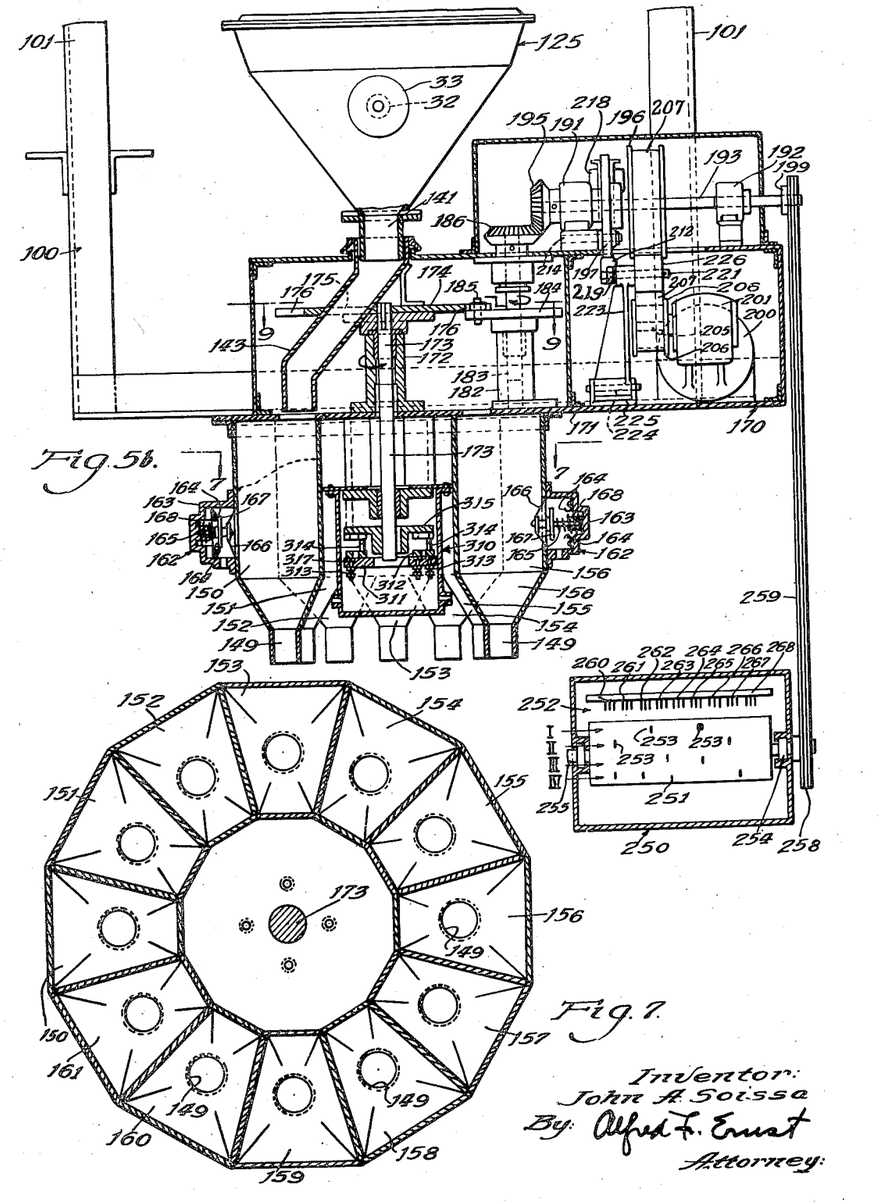
Fig. 7 is a diagrammatic section taken on line 7—7 of Fig. 5b.

As can be seen in Fig. 5b each pressure switch 162 comprises a casing 163 having a push rod 165 slidably mounted therein. A flexible diaphragm 166, such as leather, secured to the casing 163 at the edges thereof is fastened at the center thereof to one end of the push rod 165. A contact plate 167 is secured to an intermediate portion of the push rod and biased away from contact points 164 by spring 160. At the right of Fig. 5b the pressure switch 162 is held in open circuit position by spring 168 because the accumulating hopper 156 on which it is mounted is empty. To the left of Fig. 5b the switch is shown in its closed circuit position, as the bias of spring 168 has been overcome by the weight of the surfacing material contained within the accumulating hopper 150.

One arrangement for effecting drive of the spout 143 mechanically for successive discharge into adjacent accumulating hoppers is indicated at 170 in Fig. 5b. A horizontal plate 171 has secured thereto bearings 172 and 182 with their bores like extending with the axis of rotation of the spout 143.

Figure 9:
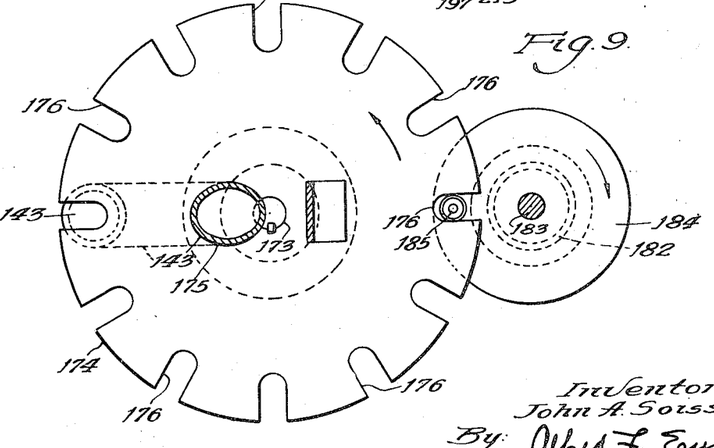
Fig. 9 is a section on line 9—9 of Fig. 5b.

A vertical shaft 173 is supported in the bearing 172 and has keyed to the upper end portion thereof a step gear 174. The spout 143 passes through a cut-out 175 in the step gear 174 and is mounted for movement therewith. The step gear has the periphery thereof provided with a plurality of slots 176, as in Fig. 9, for positioning the spout 143 for successive discharge into the twelve accumulating hoppers 150 to 161, in twelve successive steps.

A vertical shaft 183 supported in the bearing 182 has keyed to an intermediate portion thereof a disc 184 having an upstanding pin 185 near the edge thereof. The shafts 183 and 173 are so positioned relative to each other that the pin 185 engages one of the slots 176 in the step gear and effects movement of the step gear 1/12 of a revolution for each revolution of the disc 184.

A bevel gear 186 keyed to the upper end portion of the shaft 183 is in mesh with a similar bevel gear 195 keyed to the outboard end of horizontal shaft 193. The shaft 193 is mounted for rotation in pillow blocks 191 and 192 and has a pulley 196 keyed thereto between the pillow blocks. A cam 197 having a holding notch 198 as indicated in Fig. 4b is also keyed to the shaft 193.

An electric motor 200 having a built in speed reduction unit 201 is supported on the lower plate 171. A pulley 206 is secured to the shaft 205 of the speed reduction unit 201. A loose belt 207 connects the pulleys 206 and 196 and normally slips 100% so that drive of pulley 196 normally is not effected even though the pulley 206 is being driven.

Figure 4A:
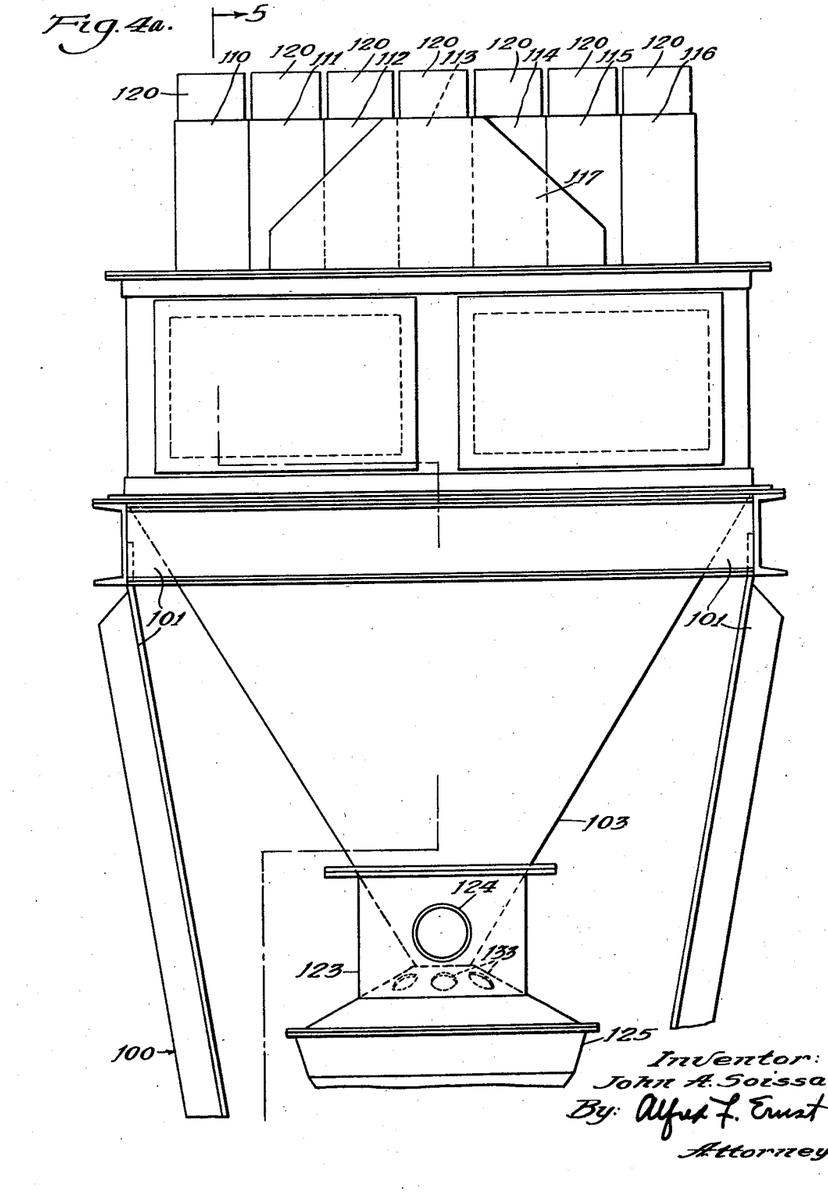
Figs. 4a and 4b together show an elevation of a practical embodiment of the apparatus of the invention.
Figure 4B:
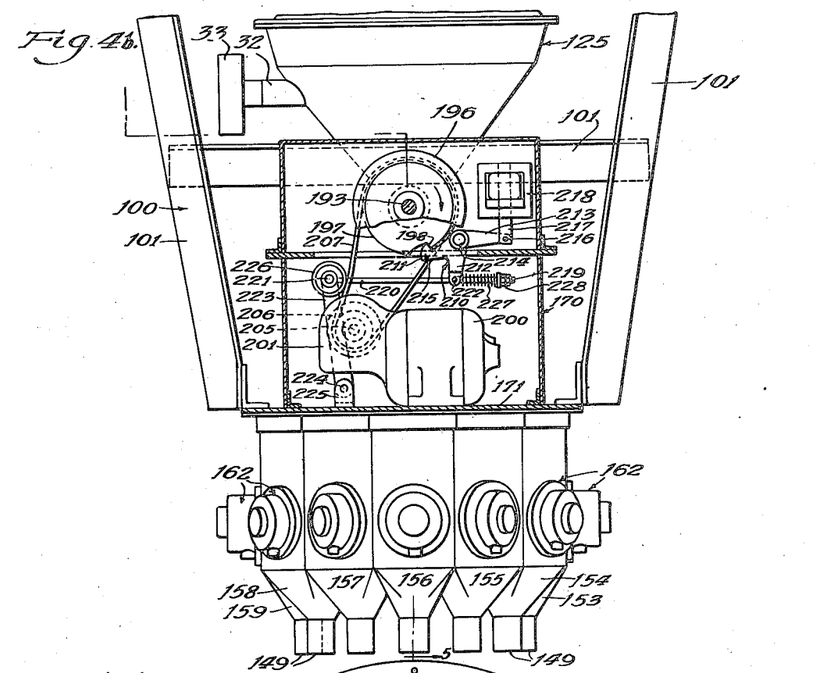

A latch 210 having arms 211, 212 and 213 as shown in Fig. 4b is mounted on shaft 214 for movement about the axis thereof. The arm 211 is provided with a head portion 215 which engages the holding notch 198 of the cam 197. The end portion of the arm 213 of the latch 210 is pivotally connected at 216 to the moving core 217 of solenoid 218.

The middle arm 212 of the latch 210 supports at 222 and is slidably mounted on a rod 220, intermediate the ends thereof. This arm 212 bears against a compression spring 227 secured to the end 219 of rod 220 by adjustable lock nuts 228. The left end portion 219 of the rod 220 is pivotally connected at 221 to the free end of a swinging arm 223 mounted for pivotal movement toward and away from the surface of the belt 207 about the shaft 224 carried by yoke 225 secured to the base plate 171. At the free end of the arm 223 revolubly mounted on the shaft 221 carried thereby is an idler pulley 226. The idler pulley 226 is so positioned relative to the surface of the belt 207 that the belt may be tightened to effect drive therethrough when the arm 223 is swung toward the right in Fig. 4b bringing the pulley 226 into contact with the belt 207.

The operation of the spout revolving mechanism is as follows. The motor 200 is continuously operated and the belt 207 allowed to slip on the pulleys 206 and 196 so that no power is transmitted thereby.

When the solenoid 218 is momentarily energized by an electric current the moving core 217 and the latch arm 213 pivotally connected thereto are pulled upwardly. The latch 210 is turned counter-clockwise in Fig. 4b, which movement releases the holding action of the head 215 on arm 211 of the latch 210 in the notch 198 of the cam 197 leaving the cam and its shaft 193 free to rotate. Force is concomitantly exerted against the spring 227 by the arm 212 of the latch 210 which moves the rod 220 toward the right in said Fig. 4b effecting a clockwise swing of the arm 223 and the idler pulley 226 toward the belt 207. Under the action of the idler pulley 226 the belt 207 is tightened and drive is transmitted from the pulley 206 to the pulley 196 effecting clockwise rotation of shaft 193. The bevel gear 195 on shaft 193 being in mesh with bevel gear 186 effects drive of shaft 183 in the clockwise direction. The pin 185 engages one of the slots 176 on the step gear 174 and effects counter-clockwise movement of the step gear 174 and the shaft 173 to which it is keyed one step at a time. With the movement of the step gear the spout 143 passing therethrough is moved counter-clockwise in said Fig. 4b one step or in the particular example shown one twelfth of a revolution.

As the solenoid 218 is deenergized before the cam 197 has completed a revolution, the head 215 of the latch 210 bears on the outer periphery of the cam and maintains the latch 210 in released position for one revolution of the cam whereby drive is transmitted through the belt 207 as above described. Upon completion of the revolution the head 215 enters into the holding notch 198 of the cam 197 under the action of the spring 227 and the belt tension and stops rotation of shaft 193 and movement of the spout. The latch 210 is revolved clockwise in Fig. 4b and the arm 212 is simultaneously moved toward the left. This motion is transmitted to the swinging arm 223 moving the idler 226 toward the left away from the belt 207 allowing the belt 207 to again slip on the pulleys 206 and 196 while the motor 200 continues to operate.

As may be seen in Fig. 5b the controller 250 comprises a drum 251 and a plurality of contactors 252 arranged in sets of three and positioned so as to be engaged by a projection or projections 253 on the surface of the drum 251 to effect closing thereof. The contactors 252 in each of the sets of three are connected respectively in series electrically with the solenoids 108 of the flow governing gates 106 associated with the openings 105, 107 and 109 of the respective bins 110 to 118. Nine sets of contactors 252, numbered 260 to 268, are provided in the particular embodiment illustrated, corresponding to the nine bins 110 to 118. The three contactors 252 of each set are arranged adjacent each other, the sets being arranged in a row parallel to the axis of the drum 252 so that by provision of projections 253 of suitable width in the direction parallel to the axis of the drum 252, one, two or all three of the contactors 252 will be actuated to cause one, two or three of the gates 105, 107 and 109 to be opened and thereafter closed. For each set, by suitably positioning a projection or projections 253 along a line on the drum parallel to the axis thereof said projection or said projections may act upon any one of the three contactors of a set or upon two or upon all three. As will be understood from description given hereafter when the drum 251 is turned to position to bring a projection or a group of projections 253 into engagement with one or more contactors 252 the corresponding gates of bin openings 105, 107, 109 are held open until released by operation of the electrical control which results in rotation of the controller drum 251 to a new position of engagement of projection with contactors.

It will be understood that this means of actuating a selected number of the gates on a bin to secure the desired proportion or amount of surfacing material from a bin may be carried out for each of the other bins 110 to 118. Moreover, by the predetermined selection of the particular openings 105, 107 and 109 of the bins to be opened and the corresponding operation of their respective gates 106 as above described, the accurate metering of the different colors from the different bins for mixing in order always to produce the blend desired is made possible. Within the limits of areas provided in the openings 105, 107 and 109 and the number of bins having these openings a simple contactor construction may be utilized to secure a great variety of color mixes and resulting color areas on the roofing sheet.

To secure sequence of different color blends or mixes of different colors to be delivered to the accumulating spaces of hoppers 150 to 161, the projections 253 may be arranged on the drum 251 in a plurality of groups spaced circumferentially about the surface of the drum 251, the number of groups corresponding to the number of steps of spout movement desired. The number of projections in each group, having consideration for the width and position of each projection, will determine both the quantity of surfacing material to be withdrawn for each position of the spout 143 and the character of blend to be produced when the bins contain different colors of surfacing materials.

Each group of projections 253 closes selected contactors 252 and thereby effects delivery of predetermined ratios of volumes of surfacing materials from the different bins. For example on the drum 251 of Fig. 5b in the uppermost group, the projection at the left is one-half the width of the projection at the right. One contactor 252 of the set 262 will be closed causing unit flow through outlet 109 of bin 112. The double width projection under set 265 will close two contactors 252 thereof and cause flow of one and two units respectively through gates 109 and 107 of bin 115. The ratio of volumes of primary colors in this particular blend therefore will be three volumes of surfacing material from bin 115 to one volume of surfacing material from bin 112.

It can be understood from the above description that it is possible to vary the volume of surfacing material discharged from any bin from 7 units to 1 unit and to vary between 7 to 1 and 1 to 1 the relation of the volumes discharged from any two bins by selective operation of gates to utilize the 4-2-1 ratio between outlet areas of the two bins.

The arrangement shown in Fig. 5b is used to effect selection of contactors mechanically to produce a given blend by the connection for movement of drum 251 in accordance with movement of the spout 143. The drum 251 is secured to shaft 255 mounted for rotation in bearings 254. Sprocket 258 is keyed to one end of shaft 255 for drive thereof by chain 259. The driving sprocket 199 for chain 259 is keyed to shaft 193 to be moved in accordance with movement of the spout moving mechanism above described. In order that the movement of the spout and movement of the drum may correspond, in the particular embodiment illustrated the ratio of sprocket 258 to sprocket 199 is twelve to one, corresponding to the spout movement effected by a step gear having twelve steps.

In order to assure discharge of surfacing materials only when the spout is properly positioned to discharge into an accumulating hopper, a selector switch 310 is provided having the selectively operable brush thereof directly connected for movement with the shaft 173 which effects movement of the spout.

The selector switch 310 comprises a base 311 of insulating material, a ring shaped inner contact 312 and a plurality of points 313 numbered from 350 to 361 arranged about the inner ring corresponding to the arrangement of hoppers 150 to 161 about the axis of movement of the spout 143. Contact between the ring 312 and the points 313 is made selectively by brushes 314 which are mounted on the disc 315 for movement with the shaft 173 and consequently for movement with the spout. The brushes 314 are arranged to complete a circuit from the inner ring 312 to a different point 313 for the twelve spout positions.

A relay 320 is provided for each pressure switch 162 on the accumulating hoppers 150 to 161 to control delivery of the primary colored surfacing materials in accordance with the height of surfacing material contained within the accumulating hopper. Each relay 320 has a set of lower contact points 321, 322 which are closed when the relay is not energized and a set of upper contact points 323 and 324 which are closed when the relay 320 is energized.

Figure 8:
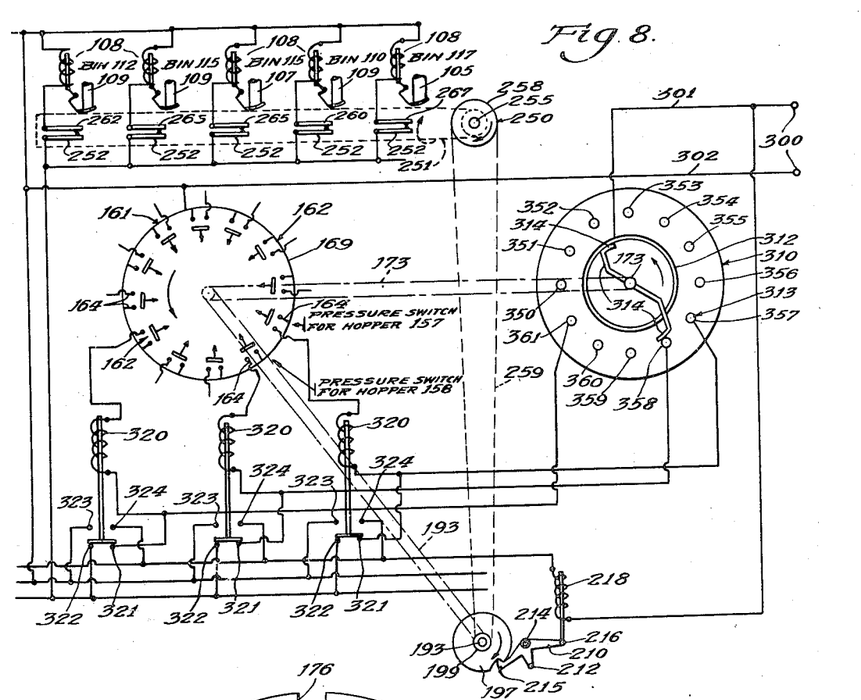
Fig. 8 is a simplified electrical wiring diagram of the control and actuating arrangement for the apparatus of Figs. 4a, 4b, 5a and 5b.

In Fig. 8, side 301 of the power line 300 is electrically connected to the inner contact 312 of the selector switch 310 and also to one side of the solenoid 218 for operating the latch 210. The points 313 of the selector switch 310 are electrically connected respectively to one lead of the relays 320 and to a lower contact 321 of the respective relay. The remaining leads of the relays are respectively connected to one contact 164 of the bin switches 162, the remaining contact 164 of each pressure switch being connected by a common bus 169 to the other side 302 of the power line 300. The other lower contacts 322 of the relays 320 are electrically connected by a common bus to one pole of each of the contactors 252 of the controller 250. The other poles of the contactors 252 are respectively connected through the individual proportioning gate operating solenoids 108 to another common bus connected to the other side 302 of power line 300 and to an upper contact 323 of the relays 320. The remaining upper contacts 324 of the relays 320 are connected through a common bus to the other side of the solenoid 218 for operating the latch 210.

It is to be understood that the brush 314 of the selector switch 310 is arranged on the shaft 173, in accordance with the position of the spout 143, to contact a switch point 313 connected through the relay 320 to the pressure switch of the accumulating hopper to which discharge of the spout 143 is directed.

As an example of the operation of the electrical control means shown in Fig. 8, the accumulating hopper 158 will be supplied with blended surfacing material. The spout 143 is positioned to direct materials discharged therefrom into the accumulating hopper 158 and the brush 314 is positioned accordingly by shaft 173 to contact the point 358 of the selector switch 310.

According to the positioning of the spout 143 a set I of projections 253 is brought beneath the groups of contactors 262 and 265 to selectively actuate solenoids 108 connected thereto from power line 302 and through the lower contact points 321 and 322 of the relay 320 connected to switch point 358 and then to the other line 301 to complete the circuit. As described above three volumes of surfacing material will be fed continuously from bin 115 to one volume of surfacing material being fed from bin 112 to the mixer which is operated continuously and delivers the blended surfacing material to the accumulating hopper 158 through spout 143.

When the level of surfacing material in the hopper 158 reaches a predetermined height, the pressure switch 162 thereon is closed, completing an electrical circuit through relay 320 and switch point 358. When the relay 320 is therefore energized the circuit between the lower contacts 321 and 322 thereof is broken, deenergizing the solenoids 108 and thereby stopping feed of materials from the primary supply bins 115 and 112. A circuit is completed through the upper contacts 323 and 324 of the relay 320, energizing the solenoid 218 from the power line 300, which moves latch 210 to effect release of the cam 197 and cause movement of the spout 143, controller 250 and selector switch 310 to the next step or position as described above. The circuit through the solenoid 218 and relay 320 is broken by movement of the selector switch to its next position and at the completion of a revolution of cam 197, the latch again engages the cam holding it from further movement and releasing the drive thereof.

The spout 143 is now positioned to direct materials discharged therefrom into the accumulating hopper 157 and the brush 314 is positioned accordingly by shaft 173 to contact the point 357 of the selector switch 310. The set II of projections is brought under the groups of contactors to close selected contacts and initiate flow of the primary color surfacing materials from differently selected supplies to the mixer and then to the hopper 157. When the hopper 157 becomes filled the pressure switch 162 thereon is closed causing movement of the spout and associated devices to their next position. This sequence of operations is repeated for each of the twelve positions of the spout 143.

If the accumulating hopper toward which the spout 143 is being directed contains sufficient surfacing material to keep the pressure switch 162 mounted thereon in a closed circuit position, upon completion of a circuit through the selector switch 310 the relay 320 will become energized lifting the movable core thereof to open the circuit through the lower contact points 321, 322 thereof thereby preventing actuation of the gate operating solenoids 108. The circuit through the upper contact points 323, 324 will immediately thereafter be closed to effect energizing of the solenoid 218. The latch 210 will therefore be released and the spout moving mechanism will be operated to direct discharge into the next hopper having the pressure switch 162 in the open circuit position.

The blends delivered to the different accumulating hoppers may be changed by substituting another controller drum 251, having projections 253 arranged to operate the contactors 252 in different predetermined relations from the operation of the first controller drum.

From the above description it will be understood that to the accumulating hoppers 150 to 161 there may be delivered for accumulation therein quantities of the comminuted material of definite colors by virtue of the blending of primary colors discharged in metered amounts and in ratios of these amounts through the proportioning openings 105, 107 and 109 and their flow governing gates. From these accumulating hoppers, in the manner described in connection with Fig. 1, the comminuted materials may be delivered to feed hoppers, such as the feed hoppers 55, 56, 57 and 58 of Fig. 1, for feed to and deposit upon a web or roofing sheet. By provision of suitable hoses, however, the material received by the accumulating hoppers 150 to 161 may be carried directly to other types of devices for applying the blended materials upon predetermined areas of a roofing sheet. For example, the hoses from the outlets 149 of the accumulating hoppers may be arranged to deliver the respective comminuted materials of different colors to the compartments of the magazine or box of the apparatus described in the patent to A. B. Walton, No. 2,157,944, issued May 9, 1939. Within the scope of the invention, also, these compartments of the magazine may constitute the accumulating spaces which in the particular embodiment herein described are represented by the accumulating hoppers 150 to 161. Similarly, the accumulating hoppers may be directly connected to feed hoppers, such as are disclosed in Fig. 1, which are operated, however, for feeding the respective comminuted materials of different color to the web or sheet in the manner described in the application of John A. Soissa, Serial No. 324,072, filed March 15, 1940, which has since become abandoned, in order to produce multi-colored roofing having a great variety of color areas.

It will also be understood by reference to the drawings, particularly Figs. 1, 5a and 5b, that the accumulating hoppers 150 to 161 may be so constructed and arranged as to be the feed hoppers 55 to 58 by suitably forming the outlet portions 149 and providing them each with a feed roll, such as the feed roll 59. Thus the pressure switch 162 at each hopper, by suitable setting, will be effective to control the operation of gates 6 or 106 on the outlets of the bins 10 to 18 or 110 to 118 so as to discharge to each accumulating hopper a predetermined amount of comminuted material from selected bins to determine quantities of differently colored materials for deposition on successive color areas on the web. In a modified conception of this phase of the invention a pressure switch 162 may be provided on each feed hopper 56 to 58 instead of on the accumulating hoppers.

It will be apparent from the above description that in either case the pressure switch may be actuated by the deposited or collected material to operate the control mechanism so as to effect closing of the outlet openings of those bins 110 to 118 which, by virtue of the selection effected by the controller 250, have discharged selected quantities in selected proportions corresponding to the amounts and the colors required for given color areas. Thus the comminuted material in predetermined amount and of predetermined color may be prepared and delivered toward the face of the web independently of the movement of the web itself. In this respect the invention differs from prior art processes and apparatus where metering of the quantity of materials to determine the total quantity and mixture of component materials is dependent upon and directly related to the web movement with the result that variations in the speed of the web, differences in arrangement of the parts of the mechanism and other conditions have caused variations in the amount of material delivered and the placement thereof upon the sheet.

As above described, it is a feature of the invention to provide means for collecting the quantity of comminuted material which is discharged from the bins 110 to 118 and metered by the controlled operation of the gates 106. This collection or accumulation of comminuted material in the accumulating spaces 150 to 161 or in the feed hoppers 55 to 58 makes it possible to effect feeding to the sheet of the comminuted material so accumulated or collected at a rate determined by the movement of the web, for example, by operating the feed rolls 59 from the mechanism which drives the web. At the same time the metering of the comminuted material discharged by the bins and, as explained, of the component separate comminuted materials discharged together from two or more bins to form a mixture is accomplished independently of the web movement. The metering of these quantities, therefore, may be determined without their being affected by variations in the mechanism such as variation in the speed of the sheet or other conditions of operating a surfacing machine such as are experienced in the roofing plants. The quantity discharged from the bins is determined by the pressure switch in accordance with its setting and is independent of the operation of the other parts of the roofing machine. When the proper quantity has been delivered from the bins to the accumulating space or to the feed hopper the discharge is cut off and the feeding of the metered quantity to the sheet thereafter may proceed by operation of the feed rolls which are timed with the sheet movement.

The provision for collection or accumulation of the metered quantity of the comminuted material, moreover, has the advantage that the changes in the colors may be effected between discharges from the bins and while the color previously discharged is being fed to the web. Since the quantities of materials which are to be placed upon the web, in the method of operation under discussion, are determined by those which are required for covering predetermined color areas, no material in excess of that which is to become applied to the sheet is discharged from the primary bins and the operation may be carried out continuously up to the last color area to be applied. Moreover, the desired color may be applied to the first color area which is to be surfaced upon the sheet without trial and waste because each of the quantities including the first to be applied to the sheet is metered.

Where in the claims the term "different color" has been used it is to be understood that not only masses of materials which have different colors are intended but those which may differ in other characteristics, whether or not of the same color, in order particularly to produce a different appearance when these materials are laid upon a roofing sheet.

In connection with the drawings, and particularly with reference to Fig. 8, it should be understood that to simplify the explanation and avoid confusion of illustration, the drawings are in part diagrammatic. The dotted line numbered 173 connected between the selector switch 310 and the arrangement of pressure switches 162 about an axis at the left of Fig. 8, signifies the driving connection between the selector switch 310 in Fig. 5b and the step gear 174 through which the spout 143 passes, the said shaft being concentric with said axis of the arrangement of the pressure switches 162 and of the accumulating hoppers 150. The inclined dotted line between the shaft 193 in Fig. 8 and the axis upon which the pressure switches are arranged is a diagrammatic showing of that portion of the drive illustrated in Fig. 5b which extends between the cam 197 and the step gear 174, the drive connection being further extended, of course, through the shaft 173 to the selector switch brush 314.

In place of the loose belt 207 and the mechanism, including the rod 220 and idler pulley 226, used in the embodiment above described to effect tightening of the belt, the electric motor 200 may be of the design known as a torque motor which is so constructed as to take the full current when it is stalled by operation of the latch 210 upon the cam 197. Such a motor upon release of the cam by actuation of the solenoid 218 will immediately start revolution of the parts described to effect movement of the selector switch 310, the arm 143 and the controller switch 250.

This application is a divisional application of my co-pending application Serial No. 392,261, filed May 7, 1941, which has since become abandoned.

For the purpose of clarity and facility of expression in the claims of this divisional application, in some claims the means providing the supplies of comminuted material, that is, the bins 10 to 18 or 110 to 118 in the drawings, are referred to as "containers." The means providing the accumulating space or the accumulating hoppers are referred to as "hoppers."

Having thus described my invention I now claim:

1. Apparatus for control of flowable comminuted material which comprises a plurality of containers for containing separate supplies of comminuted material and each having an outlet opening in a wall thereof, a plurality of flow governing means respectively associated with said outlet openings respectively to govern flow of comminuted material from said supplies, a hopper providing an accumulating space for accumulation therein of comminuted material discharged from said containers, conduit means for conducting comminuted material discharged from at least two selected ones of said supply containers to said hopper, and control means comprising a yielding part actuated by pressure thereagainst by the accumulated comminuted material in said hopper and connected to the flow governing means of said selective supply containers for successively starting and stopping the flow of the comminuted material from said selected containers for delivery to said hopper of predetermined amounts of each of said comminuted materials.

2. Apparatus for control of flowable material which comprises a container for a supply of comminuted material, flow governing means associated with said container to govern flow of said comminuted material from said supply, a plurality of hoppers each providing an accumulating space for accumulation therein of comminuted material flowing from said supply, conduit means for conducting said flowing comminuted material from said supply and constructed and arranged selectively to be positioned to deliver said flowing comminuted material to a selected hopper, and means connected to said conduit means and to said flow governing means to effect governing of flow of said comminuted material from said container when said conduit means is in position to deliver said material to said selected hopper.

3. Apparatus for control of flowable comminuted materials which comprises a container for a supply of comminuted material having an outlet opening in a wall thereof, flow governing means associated with said outlet opening to govern flow of said comminuted material from said supply, a plurality of hoppers each providing an accumulating space for accumulation therein of comminuted material flowing from said supply, conduit means for conducting said flowing comminuted material from said supply and constructed and arranged selectively to be positioned to deliver said flowing comminuted material to a selected hopper, and control means operable when said conduit means is in the selected position and actuated by the accumulated material in said selected hopper and acting on said flow governing means to open said opening in said container when said selected hopper contains less than a predetermined amount of the comminuted material and to prevent flow from said container when said selected hopper contains said predetermined amount of comminuted material.

4. Apparatus for control of flowable comminuted material which comprises a plurality of containers for separate supplies of comminuted materials, each of said containers being provided with an outlet opening in a wall thereof, flow governing means associated with each of said outlet openings respectively to govern flow of said comminuted material from said supplies, a plurality of hoppers each providing an accumulating space for accumulation therein of comminuted material flowing from said supplies, conduit means for conducting said flowing comminuted material from said containers and constructed and arranged selectively to be positioned to deliver said flowing comminuted material to a selected hopper, and control means actuated by the accumulated material in said selected hopper and acting on said flow governing means concomitantly to open said openings of at least two selected containers when said selected hopper contains less than a predetermined amount of the comminuted material and concomitantly to close said openings of said selected containers when said selected hopper contains said predetermined amount of comminuted material, said control means being connected to said conduit means to effect actuation of said control means when said conduit means is in position with the selected hopper.

5. Apparatus for control of flowable comminuted material which comprises a plurality of containers for separate supplies of comminuted materials, each of said containers being provided with an outlet opening in a wall thereof, valves associated with each said outlet opening respectively to effect opening and closing thereof, means for operating each valve to effect such opening and closing thereof, a plurality of hoppers each providing an accumulating space for accumulation therein of comminuted material flowing from said supplies, conduit means arranged to conduct said flowing comminuted material from said containers and constructed and arranged selectively to be positioned to deliver said flowing comminuted material to selected hoppers, and control means actuated by the accumulated material in selected hoppers and acting on said valves and connected to said conduit to effect opening of predetermined valves when said conduit is positioned to deliver said flowing comminuted material to a selected hopper and to effect opening of predetermined different valves when said conduit is positioned to deliver flowing comminuted material to a different hopper.

6. Apparatus for control of flowable comminuted material which comprises a plurality of containers for containing separate supplies of comminuted materials, each of said containers being provided with an outlet opening in a wall thereof, valves respectively associated with said outlet openings to govern discharge of comminuted material from said supplies, a plurality of hoppers each providing an accumulating space for accumulation therein of comminuted material flowing from said supplies, conduit means for conducting said flowing comminuted material from said containers and constructed and arranged selectively to be positioned to deliver said flowing comminuted material to selected hoppers, means for positioning said conduit means to deliver said flowing comminuted material to the selected spaces in predetermined order, and control means associated with said positioning means and constructed and arranged to operate predetermined valves for the different positions of said conduit means.

7. Apparatus for control of flowable comminuted material which comprises a container for a supply of comminuted material having an outlet opening in a wall thereof, electrically actuated flow governing means associated with said outlet opening to govern flow of said comminuted material from said supply, a plurality of hoppers each providing an accumulating space for accumulation therein of comminuted material flowing from said supply, conduit means for conducting said flowing comminuted material from said supply and constructed and arranged selectively to be positioned to deliver said flowing comminuted material to a selected hopper, means associated with each hopper and responsive to variations in the amount of the accumulated material therein, and means connected to said conduit means for selectively electrically connecting said responsive means of said hoppers to said flow governing means to effect actuation thereof when said conduit means is positioned to deliver to the selected hopper.

8. Apparatus for control of flowable comminuted material comprising a container for a supply of comminuted material having an outlet opening in a wall thereof, a valve associated with said outlet opening to effect discharge of and stoppage of flow of comminuted material from said supply, electrically actuated means for operating said valve, a plurality of hoppers each providing an accumulating space for accumulation therein of comminuted material flowing from said supply, conduit means for conducting said flowing comminuted material from said supply and constructed and arranged selectively to be positioned to deliver said flowing comminuted material to a selected hopper, switches respectively associated with said hoppers and actuated by the accumulated material therein, a selector switch having at least two points for selective contact and a common contact point, each of said hopper switches and a selected contact point of said selector switch being connected across a source of electrical supply in series with each other and with said electrically actuated means for operating said valve, whereby said valve is operated in connection with a selected accumulating space, and means constructed and arranged in connection with said conduit means and said selector switch to move said selector switch into position with its common contact point in contact with the contact point thereof which is connected in series with the hopper switch of that hopper to which the flowable material is conducted by said conduit means.

9. Apparatus for control of flowable comminuted material comprising a plurality of containers for separate supplies of comminuted materials, each of said containers being provided with an outlet opening in a wall thereof, a valve associated with each outlet to effect opening and closing thereof, a plurality of hoppers each providing an accumulating space for accumulation therein of comminuted material flowing from said supplies, a plurality of electrically actuated means respectively associated with said valves for effecting such opening and closing thereof, switches respectively associated with said hoppers and actuated upon variation of the amounts of the comminuted material within the respective hoppers, a selector switch having at least two points for selective contact respectively connected to said hopper switches, a controller having contact points connected in circuit with the respective electrically actuated means for operating said valves to determine the number of and the order of opening and closing of said valves, said controller being electrically connected with said hopper switches, connections completing the circuit across a source of electrical supply and so arranged that upon operation of a hopper switch selected ones of said valves will be opened or closed to effect or to cut off discharge of comminuted material therethrough, and conduit means connected to said selector switch to move therewith and arranged to be selectively positioned for delivering to selected hoppers said comminuted material discharged through said selected valves.

10. Apparatus according to claim 9 which comprises means operable upon completion of accumulation of comminuted material in the selected hopper upon concomitant operation of its hopper switch for moving said conduit means to a position to deliver comminuted material to a second selected hopper.

11. Apparatus for controlling flow of comminuted material which comprises a plurality of separate containers for separate supplies of comminuted materials, each supply container being provided with a plurality of discharge openings, the number of openings of each container being the same as that of the other containers, at least two openings of each container being of different area from each other, each container having its openings respectively substantially of the same area as the openings of the other containers, each of said openings being provided with a valve, means common to all of said containers for receiving the comminuted material discharged therefrom upon the opening of any of said valves, and means for concomitantly operating a selected plurality of said valves to discharge predetermined quantities of comminuted material respectively from selected containers.

12. Apparatus for controlling flow of comminuted material which comprises a plurality of separate containers for separate supplies of comminuted materials, each supply container being provided with a plurality of discharge openings, the number of openings of each container being the same as that of the other containers, at least two openings of each container being of different area from each other, each container having its openings respectively substantially of the same area as the openings of the other containers, each of said openings being provided with a valve, means common to all of said containers for receiving the comminuted material discharged upon the opening of any of said valves and comprising conduit means arranged to be selectively positioned for delivering the comminuted material to any one of at least two different discharge points, and means connected to said conduit means adapted when said conduit means is positioned in a selected position to effect operation of a predetermined selected plurality of said valves.

13. Apparatus according to claim 3 which includes means for moving said conduit means from the position to deliver the comminuted material to the selected hopper to a position to deliver the comminuted material to a second selected hopper, said means being constructed and arranged to be operable upon completion of flow of said predetermined amount of the comminuted material to said first selected hopper.

JOHN A. SOISSA.

REFERENCES CITED

The following references are of record in the file of this patent:

UNITED STATES PATENTS

| Number | Name | Date |
|---|---|---|
| 802,996 | Krottnaurer | Oct. 31, 1905 |
| 1,160,448 | Ross | Nov. 16, 1915 |
| 1,791,560 | Heppes | Feb. 10, 1931 |
| 1,998,079 | Freegard | Apr. 16, 1935 |
| 2,074,130 | Fenley et al. | Mar. 16, 1937 |
| 2,074,131 | Fenley et al. | Mar. 16, 1937 |
| 2,157,944 | Walton | May 9, 1939 |
| 2,183,026 | Mason | Dec. 12, 1939 |
| 2,348,419 | Reinhardt et al. | May 2, 1944 |
| 2,368,672 | McNamara | Feb. 6, 1945 |